(12) United States Patent
Rydström et al.

(10) Patent No.: US 12,172,712 B2
(45) Date of Patent: Dec. 24, 2024

(54) VEHICLE COMBINATION AND METHOD FOR FORMING A VEHICLE COMBINATION

(71) Applicant: Volvo Truck Corporation, Gothenburg (SE)

(72) Inventors: Mats Rydström, Billdal (SE); Leo Laine, Härryda (SE)

(73) Assignee: Volvo Truck Corporation, Gothenburg (SE)

( * ) Notice: Subject to any disclaimer, the term of this patent is extended or adjusted under 35 U.S.C. 154(b) by 644 days.

(21) Appl. No.: 17/480,414

(22) Filed: Sep. 21, 2021

(65) Prior Publication Data
US 2022/0097780 A1    Mar. 31, 2022

(30) Foreign Application Priority Data

Sep. 29, 2020  (EP) ..................................... 20198913

(51) Int. Cl.
 *B62D 53/00*  (2006.01)
 *H04W 4/46*  (2018.01)
 (Continued)

(52) U.S. Cl.
 CPC .............. *B62D 53/00* (2013.01); *H04W 4/46* (2018.02); *H04W 76/14* (2018.02); *H04B 1/3822* (2013.01)

(58) Field of Classification Search
 CPC ........ B62D 53/00; H04W 4/46; H04W 76/14; H04B 1/3822
 See application file for complete search history.

(56) References Cited

U.S. PATENT DOCUMENTS

| 10,126,755 B1 * | 11/2018 | Lavi ......................... B60D 1/62 |
| 2010/0029209 A1 * | 2/2010 | Daum ............... H04L 12/40189 398/5 |

(Continued)

FOREIGN PATENT DOCUMENTS

| WO | 2013086165 A2 | 6/2013 |
| WO | 2020159134 A3 | 6/2013 |

OTHER PUBLICATIONS

Author Unknown, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.10.0, Jun. 2016, 3GPP Organizational Partners, 254 pages.

(Continued)

*Primary Examiner* — Mohamed Barakat
(74) *Attorney, Agent, or Firm* — Withrow & Terranova, PLLC

(57) ABSTRACT

A first vehicle unit is couplable a second vehicle unit, so that a vehicle combination is formed, wherein the first vehicle unit comprises a transceiver configured to establish a sidelink to a transceiver of the second vehicle unit. In one embodiment, the first vehicle unit is configured to perform an automatic coupling procedure for coupling itself to the second vehicle unit, wherein the sidelink is established prior to completion of the coupling procedure. In another embodiment, the sidelink adds redundancy to wired communication link between respective vehicle unit computers. In yet another embodiment, the transceivers of the vehicle units remain independently addressable even after the vehicle combination has been formed.

13 Claims, 2 Drawing Sheets

(51) Int. Cl.
*H04W 76/14* (2018.01)
*H04B 1/3822* (2015.01)

(56) References Cited

U.S. PATENT DOCUMENTS

| | | | | |
|---|---|---|---|---|
| 2015/0073622 | A1* | 3/2015 | Kraeling | H04L 45/741 |
| | | | | 701/1 |
| 2017/0111798 | A1* | 4/2017 | Dieckmann | H04L 63/107 |
| 2018/0332585 | A1 | 11/2018 | Faurie et al. | |
| 2019/0139419 | A1* | 5/2019 | Wendt | G05D 1/0088 |
| 2019/0195982 | A1 | 6/2019 | El Assaad | |
| 2019/0385461 | A1 | 12/2019 | Blomstrand et al. | |
| 2020/0022005 | A1* | 1/2020 | Campos | H04W 40/22 |
| 2020/0100119 | A1 | 3/2020 | Byun et al. | |

OTHER PUBLICATIONS

Author Unknown, "3rd Generation Partnership Project; Technical Specification Group Services and System Aspects; Study on LTE support for Vehicle to Everything (V2X) services (Release 14)," 3GPP TR 22.885 V14.0.0, Dec. 2015, 3GPP Organizational Partners, 50 pages.

Author Unknown, "3rd Generation Partnership Project; Technical Specification Group Radio Access Network; Vehicle to Vehicle (V2V) services based on LTE sidelink; User Equipment (UE) radio transmission and reception (Release 14)," 3GPP TR 36.785 V14.0.0, Oct. 2016, 3GPP Organizational Partners, 57 pages.

Author Unknown, "3rd Generation Partnership Project; Technical Specification Group Radio Access Network; Study on LTE-based V2X Services; (Release 14)," 3GPP TR 36.885 V14.0.0, Jun. 2016, 3GPP Organizational Partners, 216 pages.

Author Unknown, "3rd Generation Partnership Project; Technical Specification Group Radio Access Network; Study on evaluation methodology of new Vehicle-toEverything (V2X) use cases for LTE and NR; (Release 15)," 3GPP TR 37.885 V15.2.0, Dec. 2018, 3GPP Organizational Partners, 38 pages.

Author Unknown, "Intelligent Transport Systems (ITS); Vehicular Communications; Basic Set of Applications; Part 2: Specification of Cooperative Awareness Basic Service," ETSI EN 302 637-2 V1.3.2, Nov. 2014, European Telecommunications Standards Institute, 44 pages.

Author Unknown, "Intelligent Transport Systems (ITS); Vehicular Communications; Basic Set of Applications; Definitions," ETSI TR 102 638 V1.1.1, Jun. 2009, European Telecommunications Standards Institute, 81 pages.

Flore, D., "5G V2X: The automotive use-case for 5G," 5GAA Automotive Association, 2017, http://www.3gpp.org/ftp/information/presentations/Presentations_2017/A4Conf010_Dino%20Flore_5GAA_v1.pdf, 14 pages.

Extended European Search Report for European Patent Application No. 20198913.4, mailed Mar. 5, 2021, 12 pages.

Examination Report for European Patent Application No. 20198913.4, mailed Sep. 25, 2023, 5 pages.

* cited by examiner

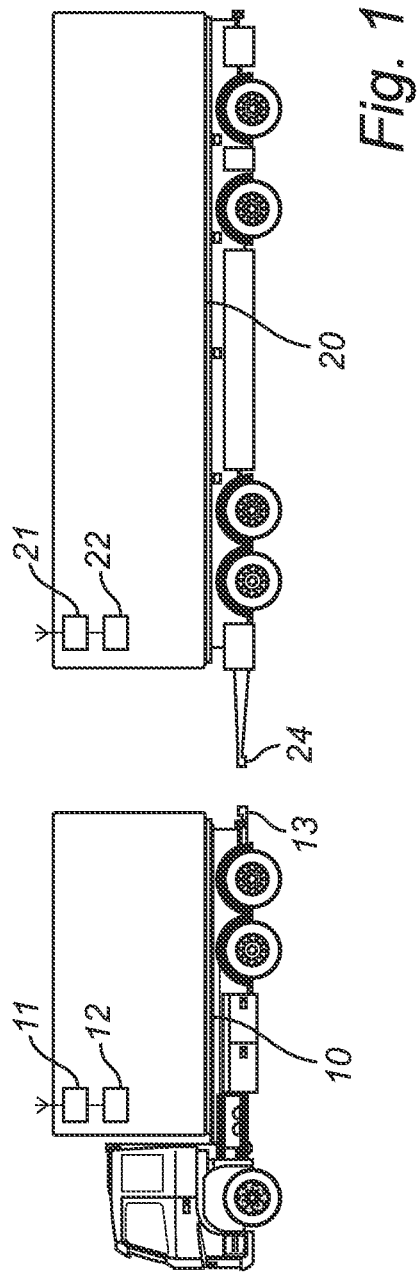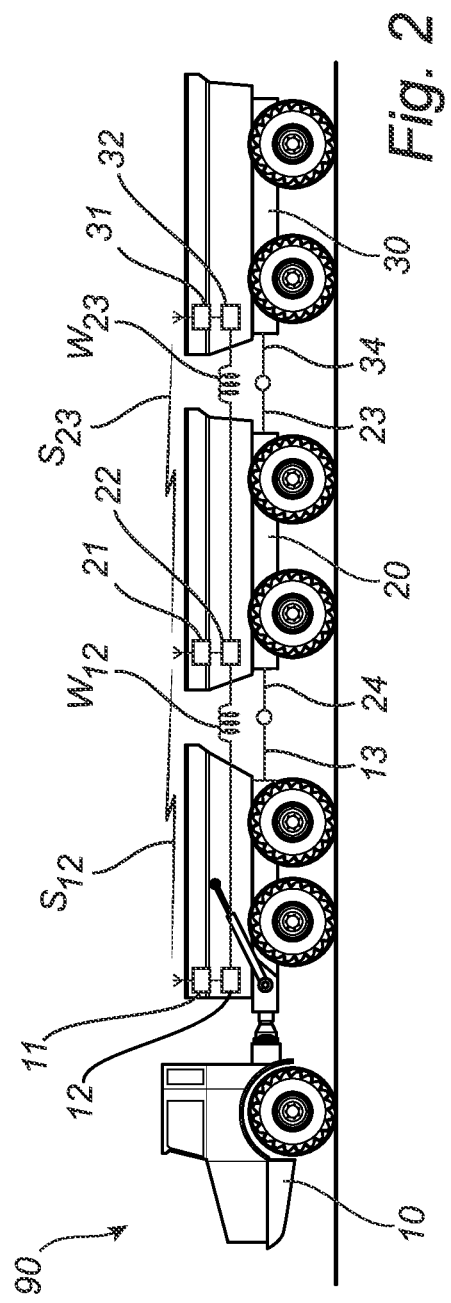

VEHICLE COMBINATION AND METHOD FOR FORMING A VEHICLE COMBINATION

RELATED APPLICATIONS

The present application claims priority to European Patent Application No. 20198913.4, filed on Sep. 29, 2020, and entitled "VEHICLE COMBINATION AND METHOD FOR FORMING A VEHICLE COMBINATION," which is incorporated herein by reference in its entirety.

TECHNICAL FIELD

The present disclosure relates to the field of vehicular communication and in particular to methods and devices for communication among vehicle units forming a vehicle combination.

BACKGROUND

Solutions offering wired connectivity within a vehicle combination are in widespread commercial use. Such combination-wide networks may use a wired infrastructure consisting of segments of Ethernet or Controller Area Network (CAN) bus, one in each vehicle unit, which are joined into a connected network once the vehicle units have been coupled. In some of the known solutions, the data lines are integrated in a solid coupling (e.g., drawbar, fifth wheel) together with electrical, pneumatic or hydraulic power lines. In other solutions, the data lines of the segments terminate at respective connectors (e.g., plugs, sockets) which, when the vehicle units are coupled, enter into mutual proximity where an operator may complete the connection.

Wired infrastructure is generally perceived as very reliable. Relatively simple equipment may offer excellent control signalling bandwidth. In the case of vehicle combinations, however, the network does not come into existence before the completion of the coupling of the vehicle units. A further potential limitation on the usefulness of wired infrastructure is that the physical connectors that join the bus segments of the respective vehicle units are exposed to aging, wear, tampering, collisions and the like. Despite the perceived reliability of wired infrastructure for control signalling, redundancy is sometimes required for safety reasons. Implementing redundancy often drives both cost and complexity of the wired infrastructure.

SUMMARY

One objective is to propose a vehicle unit that is couplable to at least one further vehicle unit to form a vehicle combination with a combination-wide network. A further objective is to propose a vehicle combination comprising vehicle units with these characteristics. A still further objective is to make available such a vehicle combination in which the combination-wide network is operative already during the coupling procedure. It is moreover an objective to propose a network-assisted coupling method for forming a vehicle combination of two or more vehicle units.

These and other objectives are achieved by the invention defined in the appended claims. The dependent claims are directed to advantageous embodiments.

In one aspect, the invention provides a first vehicle unit which is couplable to a second vehicle unit, so that a vehicle combination is formed, wherein the first vehicle unit comprises a transceiver configured to establish a sidelink to a transceiver of the second vehicle unit.

By the use of wireless infrastructure, in the form of the sidelink, the combination-wide network becomes usable as soon as the transceivers of the vehicle units enter into each other's radio coverage. Sidelink, when configured with ordinary values of transmit power and other physical-layer settings, may have a radio range of 10 m or more, which is a considerable improvement over the much closer proximity needed for a plug and socket—or other physical connectors—to become joinable. Typical payload data exchanged over a vehicular sidelink includes operational data representing real-time state variables and control variables pertaining to powertrain, driveline, drivetrain, steering, engine or other technical systems; such data is amenable to supporting the operation of the vehicle combination. Since the sidelink and thus the combination-wide network can be set up earlier than the completion of the coupling procedure, this aspect of the invention makes such operational support available over a longer time span including throughout the delicate interaction of the vehicle units during the coupling procedure. The sidelink may furthermore be utilized for exchange of non-real-time quantities (maintenance records, tachograph, other documentation), or media and entertainment content.

In a second aspect, the invention provides a vehicle combination comprising vehicle units with the above characteristics.

In some embodiments, a sidelink between respective vehicle unit computers (VUCs) is established in addition to a wired connection between the VUCs. The VUCs are configured to exchange payload data over the wired connection during normal connection and to switch to the sidelink if the wired connection fails. This way, the sidelink provides fallback connectivity and makes the system more robust as a result of the redundancy. It is preferable to have the sidelink set up before a failure of the wired connection is detected, for instance, concurrently with the establishment of the wired inter-VUC connection or even earlier.

In some embodiments, the transceivers of the vehicle units remain independently addressable even after the vehicle combination has been formed. For example, an external communication party may choose to address the first vehicle unit of the vehicle combination separately from the second vehicle unit, and vice versa. Optionally, the transceivers of the vehicle units may be configured in such manner that an external communication party may furthermore choose to call or address the vehicle combination rather than the vehicle units that it contains.

In a third aspect, the invention provides a method of forming a vehicle combination in which an automatic coupling procedure is controlled, at least partially, on the basis of data exchanged over a sidelink established between vehicle units of the combination to be formed.

In a fourth aspect, the invention provides a computer program containing instructions for causing a computer, or a vehicle unit computer (VUC) in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storages of magnetic, optical or solid-state type. Still within the scope of "data carrier", such memories may be fixedly mounted or portable.

The term "vehicle combination", as per its general usage in this disclosure, encompasses any of a combination vehicle, a truck-trailer and a road train. In specific embodiments, the term "vehicle combination" is given the stricter meaning of a combination of one powered (driven) vehicle unit and one or more non-powered vehicle units, wherein the powered vehicle may be a conventional or autonomous vehicle. The units making up a "vehicle combination" in this stricter sense are unable of operating as a combination while they are in the decoupled state, as opposed to powered vehicle units with a platooning capability.

As used herein, an "automatic" procedure may be an automated or machine-assisted procedure.

In this disclosure, furthermore, the term "sidelink" shall have a meaning consistent with applicable sections of 3GPP Technical Specifications and Technical Reports. In such specifications and report, "sidelink" may refer to a connection between two user equipments (UEs) which are assisted by a 3GPP LTE or NR radio access network to establish the sidelink. The term "sidelink" covers, furthermore, a device-to-device (D2D) connection, a Proximity Services (ProSe) connection, a PC5 interface and future technologies with equivalent characteristics and abilities. The term does not extend to IEEE 802.11 technologies.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which:

FIG. 1 shows two vehicle units configured to execute an interactively controlled, sidelink-assisted automatic coupling procedure to form a vehicle combination;

FIG. 2 shows a vehicle combination comprising three coupled vehicle units which are pairwise connected by wireless (sidelink) and wired links.

DETAILED DESCRIPTION

Figure 3:
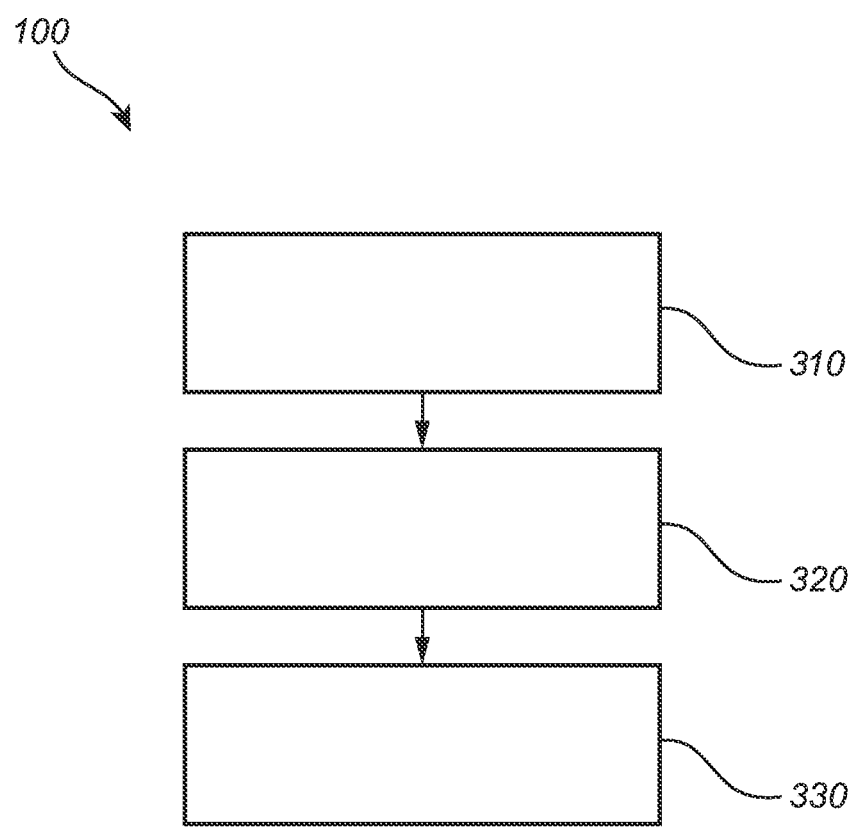
FIG. 3 is a flowchart of a method implemented in a first vehicle unit for the purpose of forming a vehicle combination with a second vehicle unit.

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

FIG. 1 shows a truck (first vehicle unit) 10 and a trailer (second vehicle unit) 20. The truck 10 includes at least propulsion means (e.g., a central engine, electric wheel drives, transmission, further powertrain components), a braking system and steering arrangements; it is an example of a powered vehicle. It includes a vehicle unit computer (VUC) 12, which may be a single processor or a network of embedded systems, such as an engine control module, powertrain control module, transmission control module, brake control module, telematics control unit, central control module etc. The trailer 20 may include a braking system and subsidiary propulsion system for reinforcing braking and/or forward acceleration, arrangements for adjusting wheels angles during motion to be more compatible with movements of the truck 10, a cooler or heater with an independent energy source, and similar installations. The braking system may be of a passive type (e.g., overrun brake) or include an active braking functionality controlled from the truck 10. The subsidiary propulsion system may be controlled from the truck 10, or may be configured to mimic movements of the truck 10 by processing sensor signals, or both. In the present disclosure, a trailer 20 with these characteristics is considered a non-powered vehicle. The trailer's 20 movement ability may be conditional on it being coupled to the truck 10. The trailer is equipped with a VUC 22, which is possibly configured for a partially different set of duties compared to the VUC 12 of the powered truck 10. The truck 10 and trailer 20 comprise respective coupling means 13, 24 (e.g., drawbar, fifth wheel), which can be engaged to form a solid coupling and disengaged to decouple the vehicle units 10, 20.

According to an embodiment, the truck 10 is equipped with a transceiver 11 configured to establish a sidelink to a further transceiver 21 with equivalent capabilities. The trailer 20 is equipped with a sidelink-enabled transceiver 21 as well. Each transceiver 11, 21 may comprise a transmitter side and a receiver side or may constitute a combined device. Each transceiver 11, 21 may comprise or be connected to at least one antenna, which may be mounted on top of the vehicle unit 10, 20 or underneath, or in a different suitable position. The antenna may comprise multiple antenna elements, especially on the receiver side. In particular, the antenna may comprise an active antenna array with beamforming capabilities, which may be utilized to increase the reliability and/or energy efficiency of the sidelink. The beamforming can be controlled in a closed-loop fashion on the basis of radio measurements. Alternatively or additionally, the beamforming uses feedforward control on the basis of a measured or observed (e.g., filtered) articulation angle of the vehicle combination 90.

As discussed initially, a sidelink may refer to a connection between two user equipments (UEs), here corresponding to the transceivers 11, 12, which are assisted by a 3GPP LTE or NR radio access network to establish the sidelink. 3GPP TS 36.300 V12.10.0 and citations therein describe specifics such as reference signals, message formats, synchronization, discovery and setup procedures for establishing a sidelink connection auto-nomously (clause 23.10.1) and with network support (clause 23.11). While in some implementations the UEs may stay in communication with a ProSe Function of the network, the sidelink connections normally remain operable even outside network coverage. After the sidelink has been established between the truck 10 and trailer 20 in FIG. 1, the data exchanged on the sidelink normally does not pass via nodes of the radio access network node (e.g., base station), nor via a core or backhaul network. The data transmissions are generally of unicast type rather than broadcast. The sidelink communication may be performed in licensed radio spectrum and may additionally utilize unlicensed spectrum; the carrier frequency may be of the order of GHz or hundreds of MHz, and the bandwidth may be of the order of tens or hundreds of MHz.

The sidelink may be used for an exchange of operational data between the respective VUCs 12, 22 when the vehicle units 10, 20 are stationary or moving. The operational data may constitute real-time state variables (observables) and control variables (e.g., commands) pertaining to powertrain, driveline, drivetrain, steering, engine or other technical systems. The operational data may include emergency communication, such as an alarm for indicating an abnormal condition in the sending vehicle unit or an override command for modifying an operational parameter in the receiving vehicle during an ongoing emergency condition.

In some embodiments, the transceivers 11, 21 remain possible to address independently even after the vehicle combination has been formed. For example, an external communication party (e.g., cargo terminal control room, roadside unit) may choose to address the transceiver 11 or the truck 10 separately from the transceiver 21 of the trailer 20, and vice versa. The addressability may be keyed by temporary network identifiers assigned to the transceivers 11, 21 by the radio access network or at the setting up of the sidelink, such as SL-RNTI, SL-N-RNTI, SL-V-RNTI and further RNTIs. Alternatively, the addressing may refer to a semi-permanent or permanent subscriber identity or to a hardware identifier. Optionally, the transceivers of the vehicle units 10, 20 may be configured in such manner that the external communication party can furthermore choose to call or address the vehicle combination rather than the vehicle units by which it is formed. This may include assigning a temporary identifier to the vehicle combination.

FIG. 2 shows a vehicle combination 90 of one powered vehicle unit 10 and two non-powered vehicle units 20, 30, each unit comprising a VUC 12, 22, 32. The vehicle units are coupled by joining, on the one hand, coupling means 13, 24 of the powered 10 and first non-powered 20 vehicle unit and, on the other hand, coupling means 23, 34 of the two non-powered vehicle units 20, 30. The VUCs 12, 22, 32 are sequentially connected by wired connections W12 and W23. According to an embodiment, each vehicle unit 10, 20, 30 further comprises sidelink-enabled transceivers 11, 21, 31 which are configured to establish and maintain sidelink connections S12, S23. The wired and sidelink connections W12, W23, S12, S23 interconnect the VUCs 12, 22, 32 sequentially, so as to allow data exchange at least between adjacent VUCs. If a relaying functionality is configured, there may be a further option of transmitting a unicast data message to a non-adjacent VUC and/or to transmit a broadcast data message addressing all VUCs of the vehicle combination 90. Also a transceiver which establishes sidelinks to non-adjacent VUCs will have non-adjacent unicast and broadcasting at its disposal.

The presence of parallel wired and wireless connections offer redundancy. In some embodiments, the wired connections W12, W23 may be the primary infrastructure, which is used in normal operation, and the (already established) sidelink connections S12, S23 are secondary in the sense that one or both are put to use if one or both wired connections W12, W23 encounter a failure or malfunction. If, according to the first option, only that wireless connection where the failure is detected (or hypothesized to have happened) is replaced by the corresponding sidelink connection, so that the combination-wide network will be using a mixed wired and wireless infrastructure. A protocol stack may be configured such that the switch between the wired and wireless physical connections is unnoticeable (non-transparent) to higher protocol layers, including the application layer at least. Such abstraction is advantageous because the application software to be executed in the VUCs may be developed without consideration of a possible switch between wired and wireless connectivity; in particular, it is possible to use legacy software developed before wireless inter-unit connectivity was available.

In some embodiments, swift substitution of a failing wired connection is expedited by setting up the sidelink connections S12, S23 already during normal operation, i.e., without awaiting a failure.

Sidelink communication, at least in licensed bands, rely on time-frequency communication resources which are allocated on demand by a scheduler function. According to some aspects, a baseline (or default, or minimum) resource allocation is requested when the sidelink is not used as main control communication channel between vehicle units. This baseline resource allocation is configured to support a rudimentary set of functions, such as emergency braking and other safety-related manoeuvres. Since the baseline resource allocation is always in place and ready to be used with short notice, the delay in transitioning to sidelink-based vehicle control is reduced compared to the case where the sidelink communication resources are requested after the wired connection fails. Once the sidelink has become the main control channel between vehicle units, an extended resource request is made, in order to reach a bandwidth sufficient to support full vehicle functionality.

With reference to FIG. 3, there will now be described a method 300 in a first vehicle unit for forming a vehicle combination with a second vehicle unit, or for extending a pre-existing vehicle combination by adding the second vehicle unit. It is assumed that each vehicle unit is equipped with a sidelink-enabled transceiver. The first vehicle unit may be a powered vehicle unit and the second vehicle a non-powered vehicle unit, or vice versa. The powered vehicle unit may be an autonomous or conventional vehicle. It is also possible to implement the method 300 in one non-powered vehicle unit that cooperates with a further non-powered vehicle unit to form a vehicle combination or extend a pre-existing vehicle combination.

The method 300 may be performed while at least one of the vehicle units is stationary; or while the vehicle units are moving at significantly less than road traffic speed; or while the vehicle units are moving for the purpose of the coupling procedure rather than utility transport.

In a first step 310, a sidelink is established between the transceivers of the vehicle units. The sidelink enables communication between the vehicle units in both directions.

In a second step 320, the first vehicle unit initiates an automatic coupling procedure for coupling the first vehicle unit to the second vehicle unit. For safety and reliability reasons, the automatic coupling procedure typically includes a sequence of predefined steps, including one or more checkpoints requiring a verification that the observables of the system (e.g., wheel angles, inter-unit distances, positions of coupling means, brake pressure) are within specified ranges. The automatic coupling procedure may further include closed-loop control of actuators, as exemplified below.

A third step 330 of the method 300 refers to the execution of those parts of the automatic coupling procedure which include interactive control. This may include exchanging measurement data with the second vehicle unit over the sidelink (in either direction) and/or exchanging control data with the second vehicle unit over the sidelink (in either direction). The interactive control may require more than the bandwidth of the baseline resource allocation; therefore, the transceiver of the first vehicle unit may be configured to request a resource allocation greater than the baseline resource allocation for the direction of the automatic coupling procedure.

An example automatic coupling procedure may include the following stages when executed by a powered first vehicle unit:

1. It is initially verified that the powertrain and braking systems are fully operable and no humans or physical obstacles are present in the vicinity of the first and second vehicle units; this decision-making may in part be based on data from a camera installed in the second vehicle unit and covering areas not visible from any point on the first vehicle unit.
2. The first vehicle unit reverses towards the front side of the second vehicle, at moderate speed and using an acoustic sensor of park-distance control type, to move into an approximate coupling position.
3. The first vehicle unit continues reversing at reduced speed and under the guidance of a distance indication based on measurement data from an optical sensor of the second vehicle unit, to arrive in an accurate coupling position.
4. The first vehicle unit instructs the second vehicle unit to extend a drawbar using a hydraulic actuator towards a cooperating coupling means in the first vehicle. The extension continues until a sensor in the first vehicle unit confirms that the drawbar has reached a position where it can be locked to the coupling means, and this triggers the vehicle unit to instruct the second vehicle unit to stop the drawbar extension.
5. The coupling means is closed, whereby the drawbar is fastened, typically allowing rotatory motion round one or more axes.
6. Electric connections, data connections (for the wired network), pneumatic power lines between the vehicle units are established, and their proper functioning is verified by transmitting data from sensors in the second vehicle unit to the first vehicle unit.

The automatic coupling procedure may be fully automated or may involve driver interaction.

The interactive control offered by the sidelink during the coupling procedure is advantageous for several reasons. Human monitoring and manipulation in the dangerous zone between the vehicle units can be avoided. The risk of damaging collision between heavy vehicle units is reduced; the vehicle units can be manoeuvred in closed loop in a smoother/softer fashion without back-and-forth movement, so that mechanical wear is limited. Due to the significantly reduced failure rate of the coupling procedure, and hence the reduced need to restart it, the sidelink support saves time even if conventional speeds of motion are preserved.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A first vehicle unit couplable to a second vehicle unit using a solid coupling to form a vehicle combination, wherein one of the first vehicle unit and the second vehicle unit is a powered vehicle unit, and the other of the first vehicle unit and the second vehicle unit is a non-powered vehicle unit:
the first vehicle unit comprising a transceiver configured to establish a sidelink to a transceiver of the second vehicle unit, wherein the transceivers are assisted by a radio access network to establish the sidelink;
wherein the first vehicle unit is configured to perform an automatic coupling procedure for coupling the first vehicle unit to the second vehicle unit using the solid coupling, which automatic coupling procedure includes one or more of:
verification that powertrain and braking systems are operable;
verification that no humans or physical obstacles are present in the vicinity of the first and second vehicle units;
movement of the first vehicle into an approximate coupling position;
movement of the first vehicle into an accurate coupling position;
extension of a drawbar;
closing of coupling means;
establishment of electric connections between first vehicle unit and the second vehicle unit;
establishment of data connections between the first vehicle unit and the second vehicle unit; and/or
establishment of pneumatic power lines between the first vehicle unit and the second vehicle unit;
wherein the sidelink is established prior to completion of the coupling procedure; and
wherein the coupling procedure is interactively controlled on the basis of data of one or more sensors exchanged over the sidelink.

2. The first vehicle unit of claim 1, configured to perform the automatic coupling procedure while the first vehicle unit is stationary.

3. The first vehicle unit of claim 1, further comprising a vehicle unit computer (VUC) configured to exchange payload data with a VUC in the second vehicle unit over the sidelink while the first and second vehicle units are coupled and in normal operation.

4. The first vehicle unit of claim 1, further comprising a vehicle unit computer (VUC) configured to exchange payload data with a VUC of the second vehicle unit while the first and second vehicle units are coupled, wherein the payload data is exchanged over a wired connection during normal operation and is exchanged over the sidelink in case of failure of the wired connection.

5. The first vehicle unit of claim 4, wherein the transceiver is configured to establish the sidelink during normal operation.

6. The first vehicle unit of claim 5, wherein the transceiver is configured to request a baseline resource allocation for the sidelink during normal operation and to request an extended resource allocation in case of failure of the wired connection.

7. The first vehicle unit of claim 1, wherein the first vehicle unit is the powered vehicle unit couplable to the second vehicle unit which is the non-powered vehicle unit.

8. The first vehicle unit of claim 1, wherein the first vehicle unit is the non-powered vehicle unit couplable to the second vehicle unit which is the powered vehicle unit.

9. The first vehicle unit of claim 1, wherein the transceiver is addressable by an external communication party independently of the transceiver of the second vehicle unit.

10. A vehicle combination which comprises one powered vehicle unit and one non-powered vehicle unit, the vehicle combination comprising:
a first vehicle unit comprising a transceiver configured to establish a sidelink to a transceiver of a second vehicle unit, wherein the transceivers are assisted by a radio access network to establish the sidelink;
wherein one of the first vehicle unit and the second vehicle unit is the powered vehicle unit, and the other of the first vehicle unit and the second vehicle unit is the non-powered vehicle unit;
wherein the first vehicle unit is configured to perform an automatic coupling procedure for coupling the first vehicle unit to the second vehicle unit using a solid coupling, which automatic coupling procedure includes one or more of:
verification that powertrain and braking systems are operable;
verification that no humans or physical obstacles are present in the vicinity of the first and second vehicle units;
movement of the first vehicle into an approximate coupling position;
movement of the first vehicle into an accurate coupling position;
extension of a drawbar;
closing of coupling means;
establishment of electric connections between the first vehicle unit and the second vehicle unit;
establishment of data connections between the first vehicle unit and the second vehicle unit; and/or establishment of pneumatic power lines between the first vehicle unit and the second vehicle unit;
wherein the sidelink is established prior to completion of the coupling procedure; and
wherein the coupling procedure is interactively controlled on the basis of data of one or more sensors exchanged over the sidelink.

11. A method implemented in a first vehicle unit for forming a vehicle combination with a second vehicle unit, wherein the vehicle combination comprises one powered vehicle unit and one or more non-powered vehicle units, wherein one of the first vehicle unit and the second vehicle unit is the powered vehicle unit, and the other of the first vehicle unit and the second vehicle unit is the non-powered vehicle unit, the method comprising:
establishing a sidelink between respective transceivers of the vehicle units, wherein the transceivers are assisted by a radio access network to establish the sidelink;
initiating an automatic coupling procedure for coupling the first vehicle unit to the second vehicle unit using a solid coupling, wherein the automatic coupling procedure includes one or more of:
verification that powertrain and braking systems are operable;
verification that no humans or physical obstacles are present in the vicinity of the first and second vehicle units;
movement of the first vehicle into an approximate coupling position;
movement of the first vehicle into an accurate coupling position;
extension of a drawbar,
closing of coupling means;
establishment of electric connections between the first vehicle unit and the second vehicle unit;
establishment of data connections between the first vehicle unit and the second vehicle unit; and/or establishment of pneumatic power lines between the first vehicle unit and the second vehicle unit; and
controlling at least a portion of the coupling procedure interactively on the basis of data of one or more sensors exchanged over the sidelink.

12. The method of claim 11, wherein the automatic coupling procedure comprises a sequence of predefined steps, including one or more checkpoints, and further comprises closed-loop control of actuators.

13. A computer program product comprising a non-transitory computer readable medium having stored thereon a computer program comprising instructions to cause a vehicle unit computer (VUC) in a sidelink-enabled vehicle unit to execute the method of claim 11.

* * * * *